United States Patent [19]

Martin et al.

[11] 4,096,234

[45] Jun. 20, 1978

[54] PRODUCTION OF ANHYDROUS ALUMINUM CHLORIDE FROM CLAY USING CATALYST AND RECYCLING OF SILICON CHLORIDE

[75] Inventors: Edward S. Martin; David A. Wohleber, both of Lower Burrell, Pa.

[73] Assignee: Aluminum Company of America, Pittsburgh, Pa.

[21] Appl. No.: 780,534

[22] Filed: Mar. 23, 1977

[51] Int. Cl.² ............................ C01F 7/56; C01F 7/58
[52] U.S. Cl. ................................... 423/135; 423/136; 423/495; 423/341; 75/113
[58] Field of Search ............... 423/135, 136, 495, 137, 423/343, 341; 75/112, 113

[56] References Cited

U.S. PATENT DOCUMENTS

| 1,865,008 | 6/1932 | Holm | 423/136 |
| 1,866,731 | 7/1932 | Staib | 423/136 |
| 1,875,105 | 8/1932 | Muggleton | 423/136 |

FOREIGN PATENT DOCUMENTS 7,008,513  12/1970  Netherlands ......................... 423/136

OTHER PUBLICATIONS

Seferovich, "Journal of Chemical Industry (Moscow)", vol. 10, 1934, pp. 62–64.
Hilli et al., "Angew. Chem.", vol. 72, 1960, pp. 850–855.

Primary Examiner—Herbert T. Carter
Attorney, Agent, or Firm—John P. Taylor

[57] ABSTRACT

Aluminum chloride is produced from clay containing aluminum oxide and silicon oxide by chlorinating the clay through contact with a mixture consisting essentially of a chlorinating agent, a reducing agent, an alkali metal compound catalyst, and silicon chloride; and thereafter separating the reaction products from the chlorination step; and recycling back to the chlorination step substantially all the silicon chloride separated from the reaction products to thereby promote the chlorination of the aluminum oxide in the clay while suppressing chlorination of the silicon oxide.

11 Claims, 1 Drawing Figure

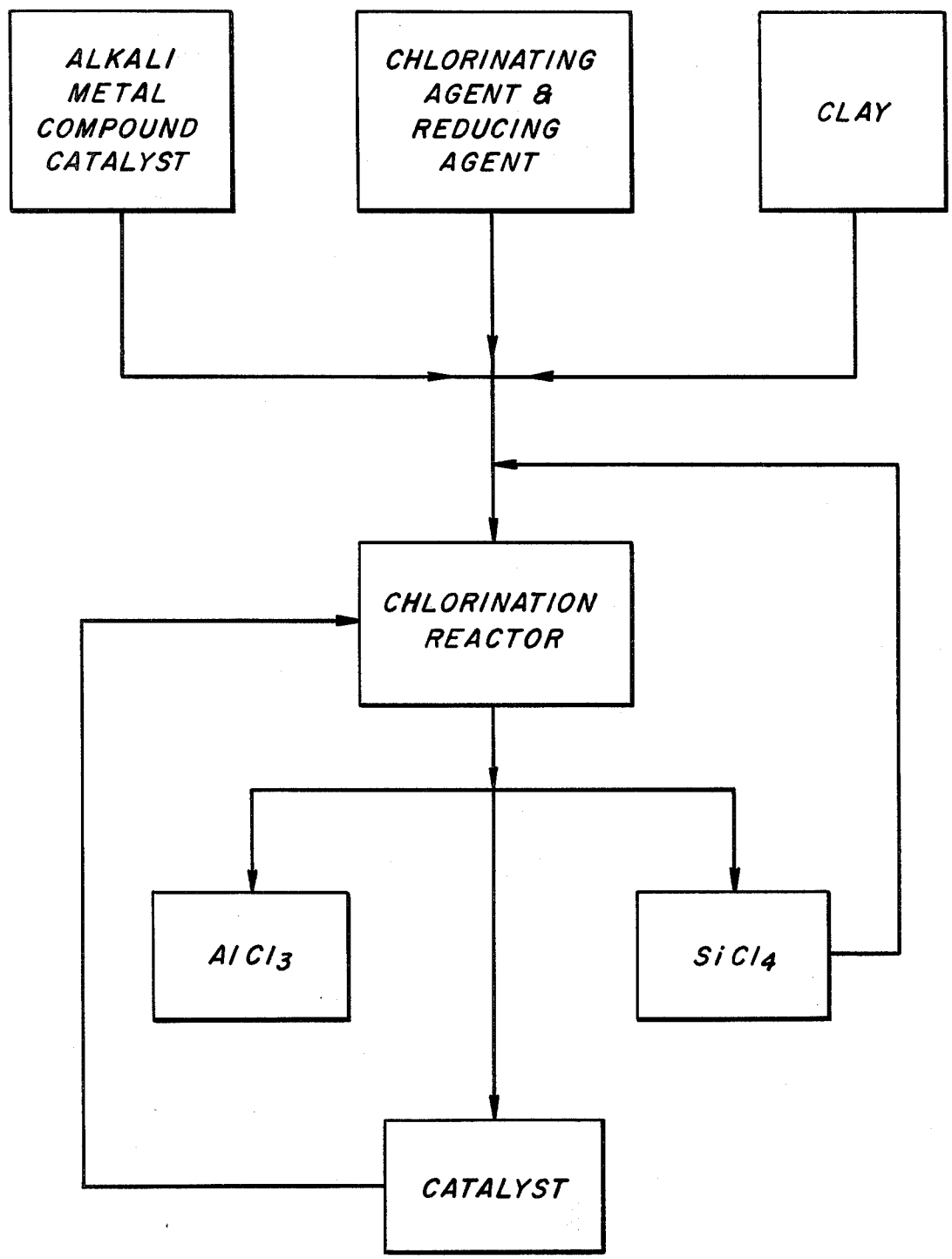

PRODUCTION OF ANHYDROUS ALUMINUM CHLORIDE FROM CLAY USING CATALYST AND RECYCLING OF SILICON CHLORIDE

CROSS-REFERENCE TO RELATED APPLICATION

This application is related to co-pending application Ser. No. 780,535, entitled "Improved Production of Aluminum Chloride from Raw Materials Containing Aluminum Compounds and Silicon Compounds", filed concurrently herewith by the same inventors.

BACKGROUND OF THE INVENTION

This invention relates to the production of aluminum chloride from clay. More particularly, this invention relates to an improved process for the chlorination of clays containing silicon oxide as well as aluminum oxide whereby the aluminum oxide is chlorinated while the chlorination of the silicon oxide is suppressed.

In the production of aluminum chloride from clay by the chlorination of the aluminum oxide in the clay, undesirable amounts of silicon chloride are produced by the concurrent chlorination of the silicon oxide within the clay. It is known to suppress the chlorination of the silicon oxide by adding silicon chloride to the chlorinating agent. For example, Staib U.S. Pat. No. 1,866,731 teaches suppressing of the formation of silicon chloride in clay by mixing equal parts of silicon chloride and chlorine together. Staib states that the silicon chloride may be obtained from the condensation of the resultant chlorination product of the clay, i.e. by recycling the silicon tetrachloride separated from the aluminum chloride produced in the chlorination reaction.

It would be, in fact, desirable to recycle back to the reaction all of the silicon chloride recovered from the chlorinated clay mixture of aluminum chloride and silicon chloride to minimize the disposal of silicon chloride which is of minimum economic value. However, it has been discovered that the recycling back of large amounts of silicon chloride while indeed suppressing the chlorination of silicon oxide in the clay, adds considerably to the reaction costs by adding the cost of separation as well as the recycle cost. Thus, it would be desirable to minimize the amount of silicon chloride produced. It also has been found that the addition of large amounts of silicon chloride to the clay chlorination reaction, while suppressing the chlorination of the silicon oxide, may also interfere with the chlorination of aluminum. For example, D. J. Milne in an article entitled "Chlorination of Bauxite in the Presence of Silicon Tetrachloride" in *Metallurgical Transactions*, Vol. 6B, September 1975 teaches that the addition of silicon chloride to the $Cl_2$ stream markedly reduced both the alumina chlorination rate and the degree of conversion.

It is also known that the addition of an alkali metal halide such as sodium chloride or potassium chloride has a beneficial effect on the chlorination of aluminum oxide contained in kaolin. For example, A. E. Seferovich in "Preparation of Anhydrous $AlCl_3$ by Kaolin Chlorination Using a Catalyst" *Journal of Chemical Industry* (Moscow) Vol. 10, 1934, pages 62–64 discusses the use of KCl, NaCl, and many other metal chlorides and their possible function as catalysts in the chlorination reaction. It has been postulated by others that the use of KCl may accelerate the chlorination of the clay due to the fact that the KCl forms a binary salt of low volatility with $Al_2Cl_6$ which has low vapor pressure and which means that carrying this component out of the reaction zone shifts the reaction in favor of the formation of $Al_2Cl_6$. (See Voronon and Galinker in "Production of Anhydrous Aluminum Chloride from Chasov-Yar Clay", *Journal of Chemical Industry* [Moscow] Vol. 7, 1930, pages 143–149.)

However, we have found nothing in the literature to indicate what effect the use of a catalyst has on the chlorination of the silicon oxide present in the kaolin to form silicon chloride. Since, as previously mentioned, it is desirable to recycle back to the reaction all of the silicon chloride made during the chlorination and further since the recycling back of large amounts of silicon chloride is undesirable from a standpoint both of process economics and the possible suppression of the aluminum oxide chlorination reaction, it would appear to be undesirable to use a catalyst in the reaction from the standpoint of the coproduction of undesirably excessive amounts of silicon chloride.

Quite surprisingly, however, it has been found that the use of a catalyst in the chlorination of clays such as kaolin containing both alumina and silica in the presence of chlorine gas or phosgene and a reducing agent such as carbon monoxide or carbon, while recycling back to the reaction zone any silicon chloride produced therein results in an enhanced yield of aluminum chloride from the aluminum oxide present in the clay while reducing the amount of silicon chloride produced in the chlorination reaction.

While we do not wish to be bound by any theory, it would appear that possibly the addition of a catalyst provides a catalytic effect on the chlorination of aluminum oxide by silicon chloride in accordance with the following reaction equation:

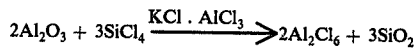

$$2Al_2O_3 + 3SiCl_4 \xrightarrow{KCl \cdot AlCl_3} 2Al_2Cl_6 + 3SiO_2$$

SUMMARY OF THE INVENTION

In accordance with the invention, aluminum chloride is produced from clay containing aluminum oxide and silicon oxide by chlorinating the clay through contact with a mixture consisting essentially of a chlorinating agent, a reducing agent, an alkali metal compound catalyst, and silicon chloride; and thereafter separating the reaction products from the chlorination step; and recycling back to the chlorination step substantially all the silicon chloride separated from the reaction products to thereby promote the chlorination of the aluminum oxide in the clay while suppressing chlorination of the silicon oxide.

BRIEF DESCRIPTION OF THE DRAWING

The sole drawing of the invention is a flowsheet illustrating the process of the invention.

DETAILED DESCRIPTION

Aluminum chloride is produced from clay by selectively chlorinating the aluminum oxide while suppressing the chlorination of the silicon oxide by the use of an alkali metal compound catalyst used with conventional chlorinating agents and reducing agents and then recycling back to the chlorination step substantially all the silicon chloride separated from the chlorinated reaction products of the chlorination step.

While the invention contemplates the use of clay as the raw material and more particularly that form of clay known as kaolin which is found in the U.S., the invention may well find application in other forms of aluminum oxide bearing raw materials having high percentages of silicon oxide, the chlorination of which it is desired to suppress while chlorinating as much of the aluminum oxide in the clay as possible.

The chlorinating agent used for chlorinating the aluminum oxide may be chlorine gas, or other convenient sources of chlorine. Particularly preferred is a compound which combines the chlorinating agent with the reducing agent as well such as, for example, $COCl_2$ or $CCl_4$. Most preferred of these agents is $COCl_2$. However, the chlorinating agent can be used separately with solid carbon or carbon monoxide (CO) as the separate reducing agent. The gaseous reducing agents, however, are preferred to the use of carbon itself.

In accordance with the invention, the clay is also chlorinated in the presence of a catalyst which is an alkali metal compound. Preferred are alkali aluminum halides and most particularly preferred is potassium aluminum chloride ($KAlCl_4$). Other alkali aluminum halides can be substituted such as sodium aluminum chloride, rubidium aluminum chloride and lithium aluminum chloride. These catalysts may be formed in situ by the initial addition of an alkali metal halide to the chlorination such as, for example, sodium chloride, sodium bromide, potassium iodide, or the like. In this regard, it should be noted that the alkali metal compound initially added to the reaction is converted to an alkali metal aluminum chloride complex having the formula $MalCl_4$ or $MCl\cdot AlCl_3$. Therefore, the alkali metal compound could be initially added as an oxide or salt other than a halide such as for example $K_2CO_3$, $KNO_3$, or the like. The amount of catalyst used may range from about 1 to 10% by weight of the total amount of clay chlorinated. Preferably the amount of catalyst used is about 3 to 7% by weight of the clay, most preferably the amount is about 5% by weight of the clay to be chlorinated.

The chlorination reaction is carried out in a fluidized bed at a temperature of from about 550° to 650° C. The particle size of the clay to be chlorinated preferably is below about 0.6 millimeters as described in more particularity in our aforementioned co-pending patent application entitled, "Improved Production of Aluminum Chloride from Raw Materials Containing Aluminum Compounds and Silicon Compounds". The chlorination reaction is carried out preferably in batch form for about 1½ to 2½ hours, preferably around 2 hours.

Following the chlorination reaction the aluminum chloride which sublimes at atmospheric pressure at 183° C, is separated from the silicon chloride which boils at atmospheric pressure at 57.6° C, by means well known to those skilled in the art such as by fractional distillation.

In accordance with the invention, all of the silicon chloride recovered in the separation step is added to the chlorinating gas feed to the reactor for the subsequent batch of clay to be chlorinated. For purposes of calculating the amount of catalyst to be used, only the weight of the new ore is used to compute the amount of catalyst to be used.

It should be noted that while the process has been described as a batch process it could be made into a continuous process by a continuing addition of fresh ore and recycled silicon chloride while at the same time removing portions of the chlorinated product. However, the overall residence time in the chlorination reactor should be in accordance with the time periods previously discussed.

To further illustrate the invention, the following experiments were conducted to show the use, separately, of a catalyst, recycle of silicon chloride back to the reactor in an amount equal to the chlorination, as well as addition to the reactor of an amount of silicon chloride greater than that actually needed to suppress net chlorination of the silica but still less than the amount recycled in the aforementioned Staib patent.

In each of the sample runs tabulated in Table I below, 100 grams of Georgia clay previously communited to 0.6 millimeters or less and roasted at 700° C for 30 minutes in a fluidized bed reactor was chlorinated at from about 120 to 125 minutes at 600° C in a 42 centimeter high, 2.3 centimeter diameter fluidized bed in which the particles were fluidized by $COCl_2$ gas at 8.4 cm/sec velocity. In each instance the $COCl_2$ gas was used as both the chlorinating agent and the reducing agent. $KAlCl_4$ was used as the catalyst where indicated. In each case the aluminum chloride was separated from the silicon chloride by distillation. The percentage of silicon oxide shown in the next to the last column on the right of the Table indicates the amount of silicon oxide chlorinated based on the difference between the total amount of silicon chloride separated from aluminum chloride less the amount of silicon chloride fed with the $COCl_2$ into the reactor. This is back calculation by subtracting from the amount of ore used, the residue recovered plus the amount of aluminum oxide chlorinated as calculated from the aluminum chloride recovered. Thus it will be noted that in Sample 4 (which represents the invention) and in Sample 6 actually slightly less silicon chloride was recovered in the final chlorinated clay product than the initial amount of silicon chloride fed to the reactor thus indicating that not only was none of the original silicon oxide in the clay chlorinated, but apparently some of the silicon chloride fed into the chlorination reaction apparently entered into the chlorination of the aluminum oxide in the clay.

It should be noted that Samples 5 and 6 indicate weight ratios higher than actually shown to be needed in Sample 4 yet still considerably less than that recited in the Staib patent. Nevertheless, it should be noted here that the mole ratio of aluminum chloride to silicon chloride produced actually is lowered in these instances while the yield is not appreciably lower than that of the invention as shown in Sample 4. It should be appreciated, as mentioned earlier that the requirement of recycling additional silicon chloride back to the reactor does result in energy losses due to the need to recycle back and heat up larger amounts of silicon chloride which apparently are produced when larger amounts of silicon chloride are initially fed into the chlorination reactor.

TABLE I

| Sample | % $KAlCl_4$ Added to Bed | Moles Fed per Hour $COCl_2$ | $SiCl_4$ | Mole Ratio $SiCl_4/COCl_2$ | % $Al_2O_3$ in Clay Recovered as $AlCl_3$ | % $SiO_2$ in Clay Chlorinated | Mole Ratio $AlCl_3$ Total $SiCl_4$ |
|---|---|---|---|---|---|---|---|
| 1 | 5.0 | 0.083 | 0 | 0 | 89.5 | 15.6 | 5.57 |

TABLE I-continued

| Sample | % KAlCl₄ Added to Bed | Moles Fed per Hour COCl₂ | Moles Fed per Hour SiCl₄ | Mole Ratio SiCl₄/COCl₂ | % Al₂O₃ in Clay Recovered as AlCl₃ | % SiO₂ in Clay Chlorinated | Mole Ratio AlCl₃ Total SiCl₄ |
|---|---|---|---|---|---|---|---|
| 2 | 0 | 0.083 | 0 | 0 | 30.1 | 36.5 | 0.80 |
| 3 | 0 | 0.707 | 0.065 | 0.092 | 25.3 | 30.2 | 0.54 |
| 4 | 5.0 | 0.707 | 0.063 | 0.089 | 90.7 | −2.0* | 5.26 |
| 5 | 0 | 0.677 | 0.091 | 0.134 | 24.2 | 28.2 | 0.48 |
| 6 | 5.0 | 0.677 | 0.098 | 0.145 | 89.0 | −0.2* | 3.85 |

*Implies some net production of AlCl₃ by reaction of SiCl₄ with the Al₂O₃ fraction of the clay.

Thus, the invention provides a method for maximizing the amount of aluminum oxide chlorinated in an aluminum oxide-silicon oxide compound while reducing to a minimum the amount of silicon chloride produced and then recycled back to the chlorination reactor while at the same time utilizing all the silicon chloride which is recovered from the final separation of the chlorinated products.

What is claimed is:

1. A process for the production of aluminum chloride from clay containing aluminum oxide and silicon oxide which comprises:
   (a) chlorinating the clay by contacting it with a mixture consisting essentially of:
      (1) a chlorinating agent;
      (2) a reducing agent;
      (3) an alkali metal compound capable of reacting with the aluminum oxide and the chlorinating agent to form an alkali metal aluminum halide catalyst; and
      (4) SiCl₄;
   (b) separating the reaction products from said chlorination step; and
   (c) recycling back to the chlorination step substantially all of the SiCl₄ separated from the reaction products
to thereby promote the chlorination of the alumium oxide in the clay while suppressing net chlorination of the silicon oxide to thereby produce substantially no additional SiCl₄.

2. The process of claim 1 wherein said chlorination is carried out in a fluidized bed at a temperature of 550°–650° C.

3. The process of claim 1 wherein the particle size of the clay is less than 0.6 millimeters.

4. The process of claim 1 wherein the clay is chlorinated for from 1½ to 2½ hours.

5. The process of claim 1 wherein said alkali metal compound catalyst contains an alkali halide.

6. The process of claim 5 wherein the alkali metal halide in the catalyst reacts with the aluminum chloride to form a catalytic compound in situ having the general formula MAlCl₄.

7. The process of claim 6 wherein the catalyst is selected from the group consisting of sodium aluminum chloride and potassium aluminum chloride.

8. The process of claim 7 wherein said catalyst is formed in situ by the addition of an alkali metal chloride selected from the group consisting of sodium chloride and potassium chloride.

9. The process of claim 1 wherein said chlorinating agent and said reducing agent consist essentially of a single agent selected from the group consisting of COCl₂ and CCl₄.

10. The process of claim 9 wherein said single chlorinating agent and reducing agent is COCl₂.

11. A process for the production of aluminum chloride from kaolin clay containing aluminum oxide and silicon oxide which comprises:
   (a) chlorinating said clay at a temperature of 550°–650° C by contacting it for a period of 1½ to 2½ hours with a mixture consisting essentially of:
      (1) COCl₂;
      (2) KAlCl₄ and;
      (3) SiCl₄;
   (b) separating the reaction products from said chlorination step by distillation; and
   (c) recycling back to the chlorination step substantially all of the SiCl₄ separated from the reaction products
to thereby promote the chlorination of the aluminum oxide in the clay while suppressing net chlorination of the silicon oxide to thereby produce substantially no additional SiCl₄.

* * * * *

UNITED STATES PATENT AND TRADEMARK OFFICE
CERTIFICATE OF CORRECTION

PATENT NO. : 4,096,234
DATED : June 20, 1978
INVENTOR(S) : Edward S. Martin and David A. Wohleber It is certified that error appears in the above-identified patent and that said Letters Patent are hereby corrected as shown below:

Column 3, line 58 - After "gas" change "feed to ---fed---.

Column 4, line 20 - After "previously" change "communited" to ---comminuted---.

Column 5, line 39 - After "the" (second occurrence) change "alumium" to ---aluminum---.

Signed and Sealed this

Eighth Day of May 1979

[SEAL]

Attest:

RUTH C. MASON
Attesting Officer

DONALD W. BANNER
Commissioner of Patents and Trademarks